US 6,546,358 B1

United States Patent
Hugo

(10) Patent No.: US 6,546,358 B1
(45) Date of Patent: Apr. 8, 2003

(54) PERFORMANCE ASSESSMENT OF NON-DEADTIME COMPENSATED CONTROLLERS

(75) Inventor: Alan Hugo, Danville, CA (US)

(73) Assignee: Alan J. Hugo, Danville, CA (US)

( * ) Notice: Subject to any disclaimer, the term of this patent is extended or adjusted under 35 U.S.C. 154(b) by 0 days.

(21) Appl. No.: 09/501,129

(22) Filed: Feb. 9, 2000

(51) Int. Cl.$^7$ .......................... G06F 19/00; G05B 13/02
(52) U.S. Cl. .......................... 702/179; 700/32; 702/182
(58) Field of Search ................................ 702/179, 182; 700/28, 29, 30, 32, 51

(56) References Cited

U.S. PATENT DOCUMENTS

| | | | | |
|---|---|---|---|---|
| 4,965,713 A | * | 10/1990 | Hong et al. | 417/18 |
| 5,796,606 A | * | 8/1998 | Spring | 700/83 |
| 5,838,561 A | * | 11/1998 | Owen | 700/32 |
| 6,421,575 B1 | * | 7/2002 | Shakespeare | 162/262 |
| 6,459,939 B1 | * | 10/2002 | Hugo | 700/44 |

OTHER PUBLICATIONS

Duncan et al., "Evaluating the Performance of Cross–Directional Control Systems", IEEE, 1999.*
Badmus et al., "Performance Assessment: A Requisite for Maintaining your APC Assets", IEEE, unknown date.*
Horch et al., "A Modified Index for Control Performance Assessment", IEEE, 1998.*
Desborough, L.D., Z Harris, T.L. Cdn. J. of Chem Eng 70, 1992 pp. 1186–1197 Performance Assessment for Univariate Feedback Controllers.
Harris, T.J., Seppala, C.T., Z Desborough, L.D. J. of Process Control 9, 1999, pp 1–17 A Review of performance monitoring and assessment techniques for univariate and multivariate control systems.

* cited by examiner

Primary Examiner—Patrick Assouad

(57) ABSTRACT

A method for determining the performance of non-deadtime compensated controllers (i.e., PID) requiring only closed-loop data and an estimate of the process deadtime. A numerical measure is calculated which is a comparison of the actual variation of the process to the variation that would be expected if the process were controlled by an optimal non-deadtime compensated controller.

1 Claim, 1 Drawing Sheet

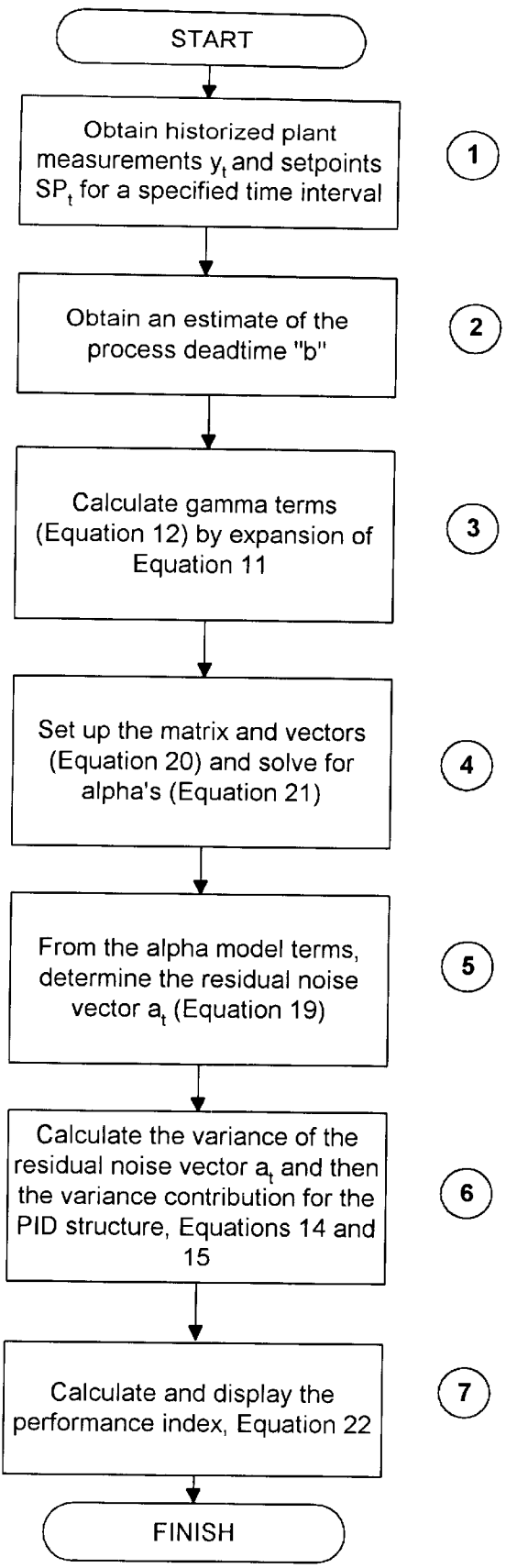
Figure #1

PERFORMANCE ASSESSMENT OF NON-DEADTIME COMPENSATED CONTROLLERS

STATEMENT REGARDING FEDERALLY SPONSORED RESEARCH OR DEVELOPMENT

N/A

REFERENCE TO MICROFICHE INDEX

N/A

BACKGROUND—FIELD OF INVENTION

This invention relates to a technique to accurately assess the performance of non-deadtime compensated (e.g., proportional-integral-derivative or PID) Controllers. Specifically, the technique accounts for the reduction in achievable performance of these controllers due to the lack of deadtime compensation as compared to minimum variance controllers.

BACKGROUND—DISCUSSION OF PRIOR ART

Non-deadtime compensated controllers, in particular PID controllers, are the prevalent form of controllers in many industrial applications. It is necessary to evaluate the performance of these controllers for the following reasons:

1. Analyze current controller shortcomings.
2. Explore future control opportunities.
3. Benchmark the current controller quality.

Performance of these controllers is largely defined as how well the controller maintains the process measurement at setpoint. A method for evaluating this question is the subject of this patent.

The simplest and most direct technique of determining controller performance is to calculate the variance between the measurement ($y_t$) and the setpoint ($SP_t$), i.e., $$\sigma^2 = \frac{1}{n}\sum_{t=1}^{n}(y_t - SP_t)^2$$

The subscript t on all variables indicates that the value is for the time t (t−1 refers to the value at the previous time, etc). While simple to claculate, this measure has the extreme disadvange that it is dependent on the level of disturbances or setpoint changes (i.e., only reason why the setpoint would not equal the measurement is due to disturbance/setpoint changes), and is thus more an indication of the disturbance/setpoint spectrums than the capabilities of the controller.

For this reason Harris et al. (1992) defined a Performance Index measure ( ) that is independent of the disturbance/setpoint change spectrum and can be readily used to determine the actual performance of the controller. This measure compares the performance of the controller to a theoretical Minimum Variance controller (i.e., the best physically realizable linear controller, which does contain a deadtime compensator), and can be calculated from routine operating data. This latter property is a strong advantage, as no plant tests are required to determine the measure. This measure is common in industry and is often referred to as the Harris Performance Index. This technology described in this patent is a modification or extension to the Harris Performance Index to account for one of the limitations of non-deadtime compensated Controllers.

The Minimum Variance controller referenced by Harris et al. (1992) employs a model of the process in the following form:

$$y_t = \frac{\omega(B)B^b}{\delta(B)}\mu_t + \frac{\theta(B)}{\phi(B)\nabla^d}a_t \qquad (1)$$

$$= G_p\mu_t + G_d a_t \qquad (2)$$

This is standard time series notation for process transfer functions, and says that the output $y_t$ is a function of the input $u_t$ and an independent white noise input $a_t$. B is the backwards shift operator, i.e. $By_t=y_{t-1}$. The input passes through a linear discrete process model, while the noise input passes through a linear discrete disturbance model.

This is all the information required to design a Minimum Variance Controller. While these controllers provide the best possible control, they are never implemented as they result in excessive input movement and are sensitive to model mismatch. They do, however, represent an upper bound on the performance of a system.

A minimum variance controller contains deadtime compensation, that is, the current output is based on past outputs at least as far back in time as the process deadtime. In general, these controllers are of the form:

$$u_t=\alpha(B)\tilde{y}_t+\beta(B)u_{t-1} \qquad (3)$$

$$=G_c\tilde{y}_t \qquad (4)$$

The order of the polynomial $\beta(B)$ is at least b, where b is the deadtime divided by the sampling time. Here $\tilde{y}_t$ is the deviation from setpoint, i.e., $\tilde{y}_t=SP-y_t$. The process input $u_t$ is therefore a function of the current and past process output deviations from setpoints $\tilde{y}_t$ and the past b process inputs $u_{t-1}, u_{t-2}, \ldots u_{t-b}$.

In contrast, the output for a PID controller is calculated as:

$$u_t=u_{t-1}+\alpha_0\tilde{y}_t+\alpha_1\tilde{y}_{t-1}+\alpha_2\tilde{y}_{t-2} \qquad (5)$$

Which indicates that the current controller output is a function of only the last controller output and the last few measurements. PID and other non-deadtime compensated controllers will result in degraded control for process with significant deadtime as they lack a memory term for control actions past the most recent one.

This invention addresses the above limitation of PID controllers and their assessment using the standard Harris Index. There is no method to differentiate in the Harris Index the contribution due to detuning and equipment limitations and that due to the restricted structure of the PID controller itself. The basis of the performance measure in this invention is an optimal non-deadtime compensated (or PID) controller, and thus this index will give an indication of detuning or equipment limitations exclusively.

Of concern in the present invention is to determine the performance of a non-deadtime compensated controller (i.e., proportional-integral-derivative (PID)) using normal closed-loop operating data.

It is, therefore, a feature of the present invention to provide a method to determine the performance of a PID Controller, or of any controller that lacks deadtime compensation.

It is, also, a feature of the present invention that it only requires normal operating data to determine the controller performance.

Yet another feature of the present invention is that the performance measure adequately reflects the lack of deadtime compensation of PID controllers.

It is, also, a feature of the present invention that it has the same range and interpretation as the Harris Controller Performance Index.

Additional features and advantages of the invention will be set forth in part in the description which follows, and will in part be apparent from the description, or may be learned from practice of the invention. The features and advantages of the invention may be realized by means of the combinations and steps pointed out in the appended claims.

BRIEF SUMMARY OF THE INVENTION

To achieve the objectives, features, and advantages, in accordance with the purpose of the invention as embodied and broadly described herein, a method to determine the performance of a non-deadtime compensated controller is provided. This performance measure accounts for the lack of deadtime compensation of these controllers, which is not accounted for in other metrics used to calculate controller performance, and may be calculated using only on-line data and an estimate of the deadtime.

OBJECTS AND ADVANTAGES

Accordingly, besides the objects and advantages of the non-deadtime compensated Controller Performance Index described in my above patent, several objects and advantages of the present invention are:

a) to assess the performance of a non-deadtime compensated controllers using only normal operating data;

b) to obtain a measure that has the same interpretation and range of the Harris controller performance index;

c) to obtain a measure that accounts for the lack of deadtime compensation of the controller.

BRIEF DESCRIPTION OF THE DRAWINGS

FIG. 1 shows a flow diagram indicating the sequence of calculation performed to calculate the performance index.

DESCRIPTION

The derivation for performance assessment of non-deadtime compensated controllers is in 2 parts. The first part is a derivation of the increase in minimum theoretical achievable variance as a result of the lack of deadtime compensation. The second part closely follows the work by Harris et al. (1992) in determining the actual variance, with a modification in the last step to account for the lack of deadtime compensation.

Part 1: Minimum Theoretical Achievable Variance

It is assumed that the process model is first order plus deadtime, and the disturbance model is a random walk. Then Equation 1 may be expressed as:

$$y_t = \frac{\omega_o B^b}{(1-\delta_1 B)} u_t + \frac{1}{\nabla} a_t \qquad (6)$$

A PID controller, which is a standard non-deadtime compensated controller, may be expressed in the form:

$$u_t = \frac{(k_1 + k_2 B + k_3 B^2)}{(1-B)} y_t \qquad (7)$$

$$= G_c y_t \qquad (8)$$

The constants $k_1$, $k_2$ and $k_3$ which result in the minimum variance of the process output are given by $$k_1 = \frac{1}{b\omega_o} \qquad k_2 = \frac{-\delta_1}{b\omega_o} \qquad k_3 = 0 \qquad (9)$$

From Equations 2 and 8, the expected value of the variance of the process output is given by $$E\{y_t\}^2 = E\left\{\frac{1}{1+G_p G_c} a_t\right\}^2 \qquad (10)$$

Substituting the values for $G_p$ and $G_c$ from 6 and 7 with the optimum controller values from Equation 9 and then simplifying gives:

$$E\{y_t\}^2 = E\left\{\frac{1}{1-B+\frac{1}{b}B^b} a_t\right\}^2 \qquad (11)$$

$$= E\{(1+B+B^2+\ldots B^{-b+1}+\gamma_b B^{-b}+\gamma_{b+1}B^{-b-1}+\gamma_{b+1}B^{-b-2}+\ldots)a_t\}^2 \qquad (12)$$

$$= (1+1+\ldots 1+\gamma_b^2+\gamma_{b+1}^2+\gamma_{b+2}^2+\ldots)\mathrm{var}(a_t) \qquad (13)$$

$$= b \cdot \mathrm{var}(a_t) + (\gamma_b^2 + y_{b+1}^2 + \ldots) \cdot \mathrm{var}(a_t) \qquad (14)$$

$$= \sigma_{MVC}^2 + \sigma_{PID}^2 \qquad (15)$$

The parameters $\gamma_b, \gamma_{b+1}, \gamma_{b+2}$ etc. may be easily found by long division of Equation 11. For stable systems, these parameters converge to zero, and the infinite series in Equation 12 may be approximated by a finite series. The first b terms in the expansion above represent the expected value as a result of the process deadtime, while the remainder terms represent the increase in the variance due to the lack of deadtime compensation.

Part 2: PID Performance Index

1. The Harris Performance Index is defined as below. First, assume the closed loop impulse weights can be divided into 2 terms $$\tilde{y}_t = \psi(B)a_t = \psi_1(B)a_t + \psi_2(B)a_{t-b} \qquad (16)$$

where $$\psi_1(B) = 1 + \psi_1 B + \psi^2 + \ldots^2 + \ldots + \psi_{b-1} B^{b-1} \qquad (17)$$

$$\psi_2(B) = 1 + \psi_1 B + \psi \psi_2 B^2 + \ldots + \psi_m B^m \qquad (18)$$

Equation 17 represents the response of the process before the deadtime, and is invariant to the controller. Equations 18 represents the response after the deadtime, which is affected by the controller and is the contribution due to model mismatch and detuning and the lack of deadtime compensation.

The left hand side of 16 is known. As in Harris et al. (1992), the first m α parameters in Equation 18 may be estimated using least squares and normal operating data 1,2. In matrix form, Equation 18 is 4,5:

$$\tilde{y} = \underline{X}\alpha + \underline{e} \quad (19)$$

where $$\underline{\tilde{y}} = \begin{bmatrix} \tilde{y}_n \\ \tilde{y}_{n-1} \\ \vdots \\ \tilde{y}_{b+m} \end{bmatrix} \quad X = \begin{bmatrix} \tilde{y}_{n-b} & \tilde{y}_{n-b-1} & \cdots & \tilde{y}_{n-b-m+1} \\ \tilde{y}_{n-b-1} & \tilde{y}_{n-b-2} & \cdots & \tilde{y}_{n-b-m} \\ \vdots & \vdots & \ddots & \vdots \\ \tilde{y}_m & \tilde{y}_{m-1} & \cdots & \tilde{y}_1 \end{bmatrix} \quad \underline{\alpha} = \begin{bmatrix} \alpha_1 \\ \alpha_2 \\ \vdots \\ \alpha_m \end{bmatrix} \quad (20)$$

The parameter estimates are found by solving the set of equations:

$$(\underline{X}^T\underline{X})\underline{\alpha} = \underline{X}^T\underline{\tilde{y}} \quad (21)$$

As in Harris et al.(1992), the residual mean square error is given by:

$$s_e^2 = \frac{(\underline{\tilde{y}} - \underline{X}^T\underline{\alpha})^T(\underline{\tilde{y}} - \underline{X}^T\underline{\alpha})}{(n-b-2m+1)} \quad (22)$$

This is the estimated variance due to process output variation before the deadtime. For non-deadtime compensated control, there is an additional variance after the deadtime as given from Equations 15.

The least squares estimate for the normalized performance index η(b) is 7

$$\hat{\eta}(b) = 1 - \left( \frac{n-b-m+1}{n-b-2m+1} (\underline{\tilde{y}} - \underline{X}^T\underline{\alpha})^T \frac{(\underline{\tilde{y}} - \underline{X}^T\underline{\alpha})}{\tilde{y}^T\tilde{y} + \bar{y}^2} + \frac{\sigma_{PID}^2}{\sigma_y^2} \right) \quad (22)$$

where $\sigma_{PID}^2$ is from Equations 14 and 15, with the value of the variance $\alpha_t$ in Equation 14 determined from Equation 19. The value $\sigma_{\tilde{y}}^2$ is the variance of the deviation from setpoint $y_r$.

ADDITIONAL EMBODIMENTS

1) Effects of higher order disturbances may be accounted for using the method of Ser. No. 09/340,531 "Performance Assessment of Model Predictive Controllers".

2) Higher order process models may also be incorporated into the analysis.
3) Feedforward controllers, cascade controllers, and setpoint change models may be incorporated into the analysis.
4) The performance index (Equation 22) may be defined differently by suitable algebraic manipulations.
5) The performance measurement may be extended to the time and frequency domain.
6) The performance measurement may be applied to other non deadtime compensating controllers other than PID.

CONCLUSIONS, RAMIFICATIONS, AND SCOPE

Accordingly, the reader will see that the method described herein is able to measure the performance of a non-deadtime compensated controllers so that it may be determined if it is detuned or has model mismatch. This method requires only on-line data and an estimate of the process deadtime. Although the description above contains many specificities, these should not be construed as limiting the scope of the invention but as merely providing illustrations of some of the preferred embodiments of the invention.

Thus the scope of the invention should be determined by the appended claims and their legal equivalents, rather than the derivations given.

What is claimed is:

1. A method of determining the performance of non-deadtime compensated controllers comprising:
    a) collecting operating data for a process comprising time series of controlled variable outputs and simultaneous setpoints;
    b) obtaining from any source an estimate of the deadtime of the said process;
    c) novel steps for estimating the theoretical process output varianve if an optimal non-deadtime compendated controller was applied to the said process;
    d) steps for estimating the theoretical process output variance if a minimum variance controller was applied to the said process;
    e) steps for calculating the actual process variation of the said process from said outputs and said setpoints;
    f) novel steps for comparing and displaying the said actual process variation to said variance of step c) plus said variance of step d).

* * * * *